Oct. 18, 1949.                     O. STEINER                     2,485,119
         AERIAL CAMERA WITH PHOTOELECTRIC MEANS RESPONSIVE
              TO ILLUMINATION BOMB FOR OPERATING GRID SHUTTER
Filed June 20, 1945                                        8 Sheets-Sheet 1
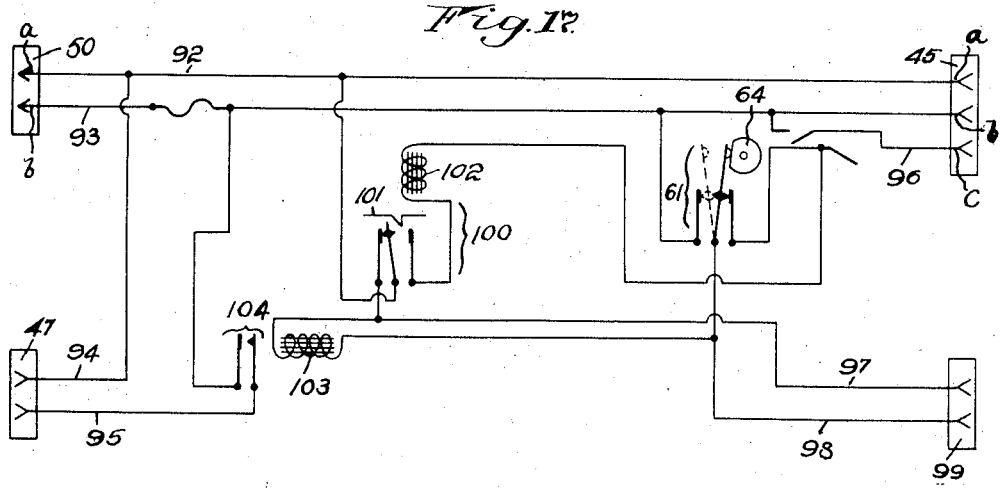
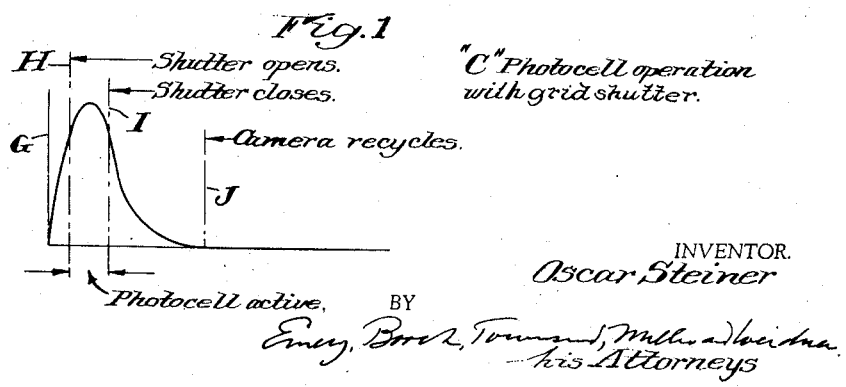
INVENTOR.
Oscar Steiner Oct. 18, 1949.   O. STEINER   2,485,119
AERIAL CAMERA WITH PHOTOELECTRIC MEANS RESPONSIVE
TO ILLUMINATION BOMB FOR OPERATING GRID SHUTTER
Filed June 20, 1945   8 Sheets-Sheet 2
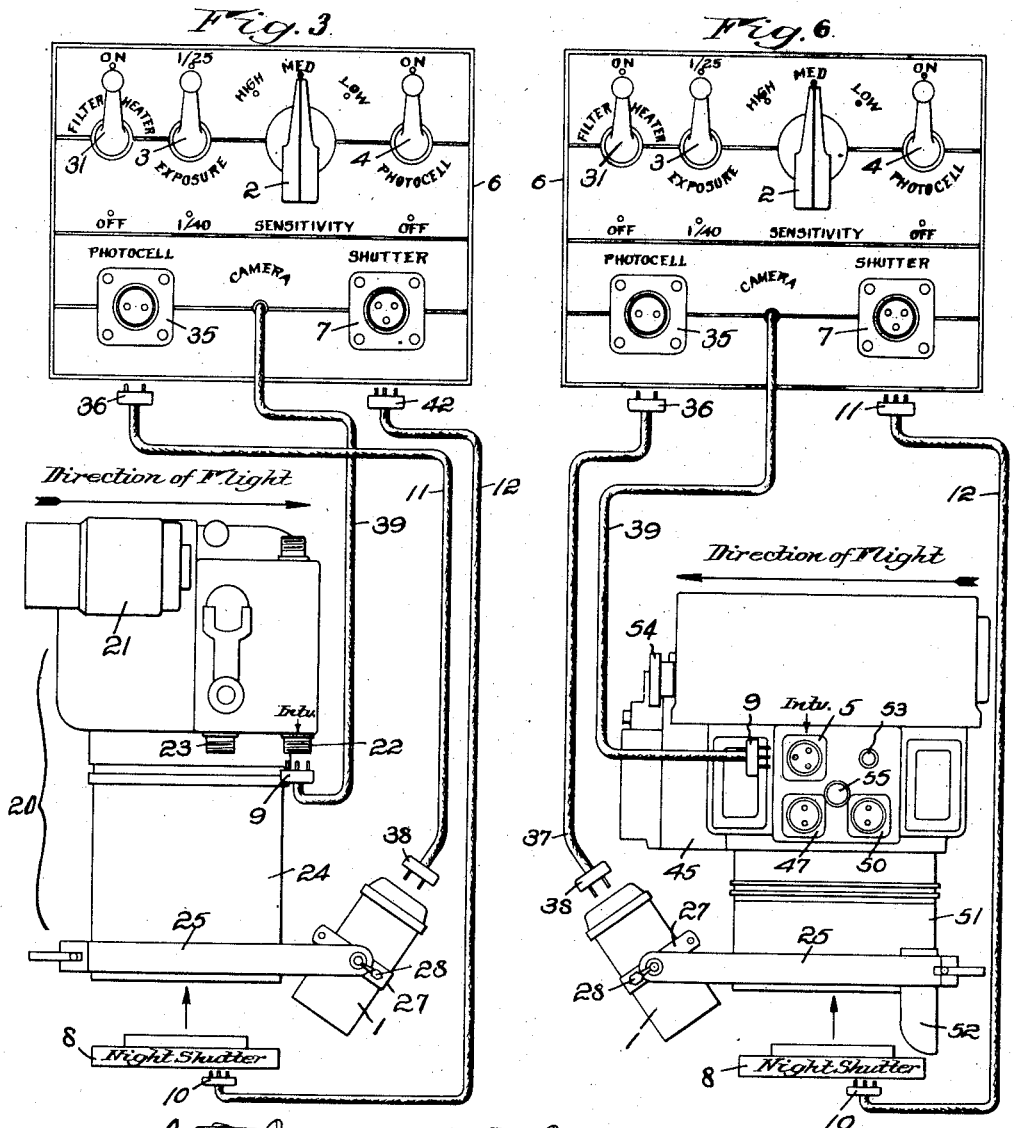
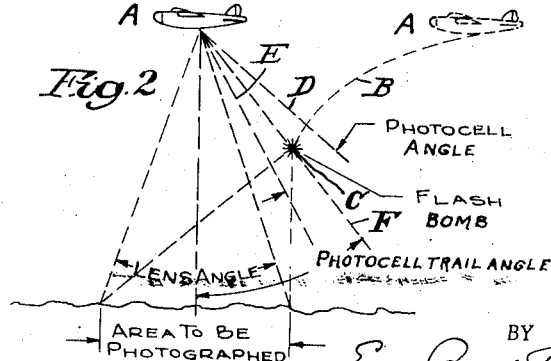
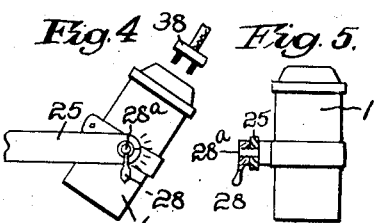
INVENTOR.
Oscar Steiner
BY
his Attorneys Oct. 18, 1949.　　　　　O. STEINER　　　　　2,485,119
AERIAL CAMERA WITH PHOTOELECTRIC MEANS RESPONSIVE
TO ILLUMINATION BOMB FOR OPERATING GRID SHUTTER
Filed June 20, 1945　　　　　　　　　　　　　　8 Sheets-Sheet 3
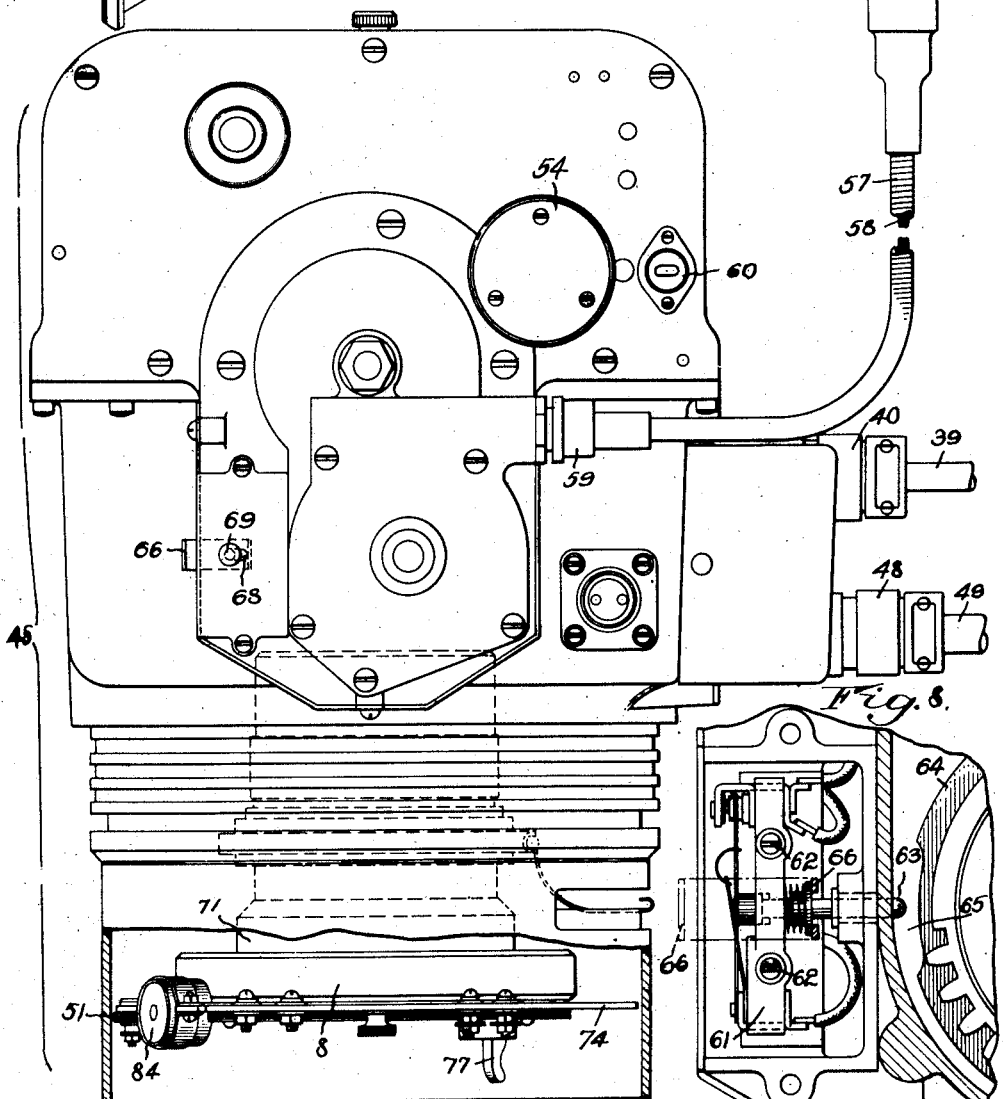
INVENTOR.
Oscar Steiner
BY
Emery, Booth, Townsend, ...
his ATTORNEYS

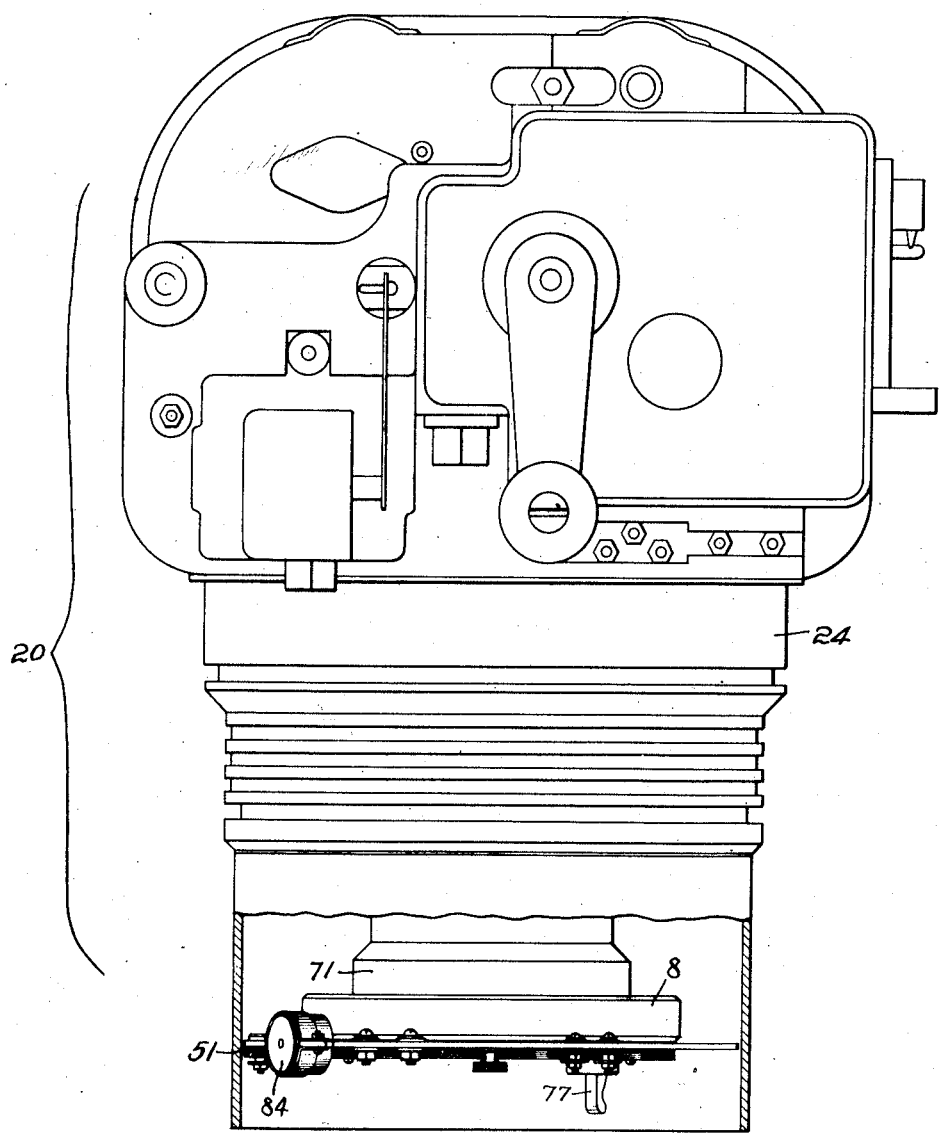

Oct. 18, 1949.  O. STEINER  2,485,119
AERIAL CAMERA WITH PHOTOELECTRIC MEANS RESPONSIVE
TO ILLUMINATION BOMB FOR OPERATING GRID SHUTTER
Filed June 20, 1945  8 Sheets-Sheet 5
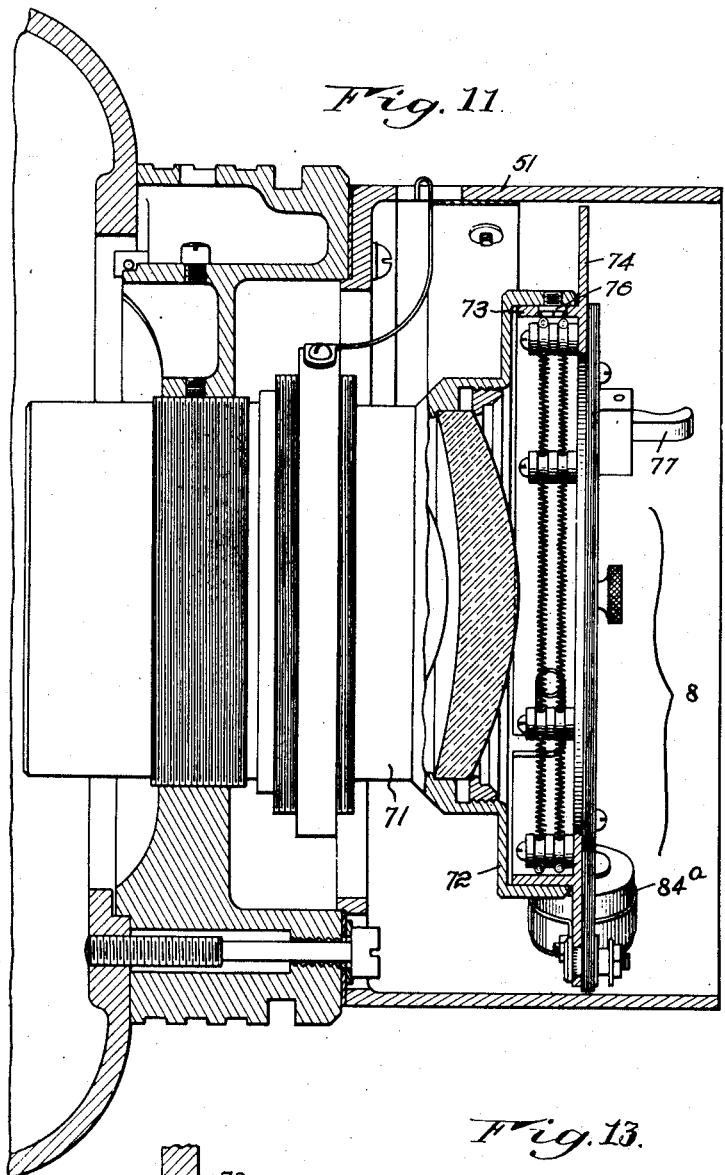
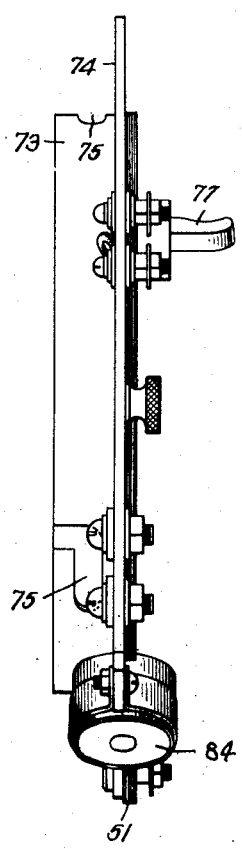
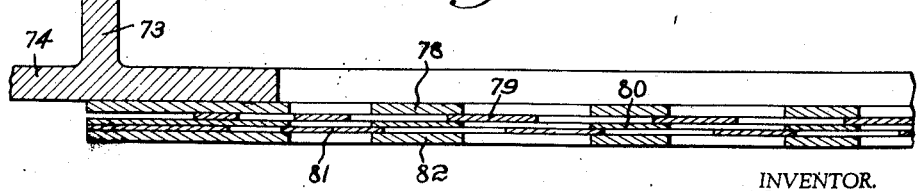
INVENTOR.
Oscar Steiner
BY
his ATTORNEYS

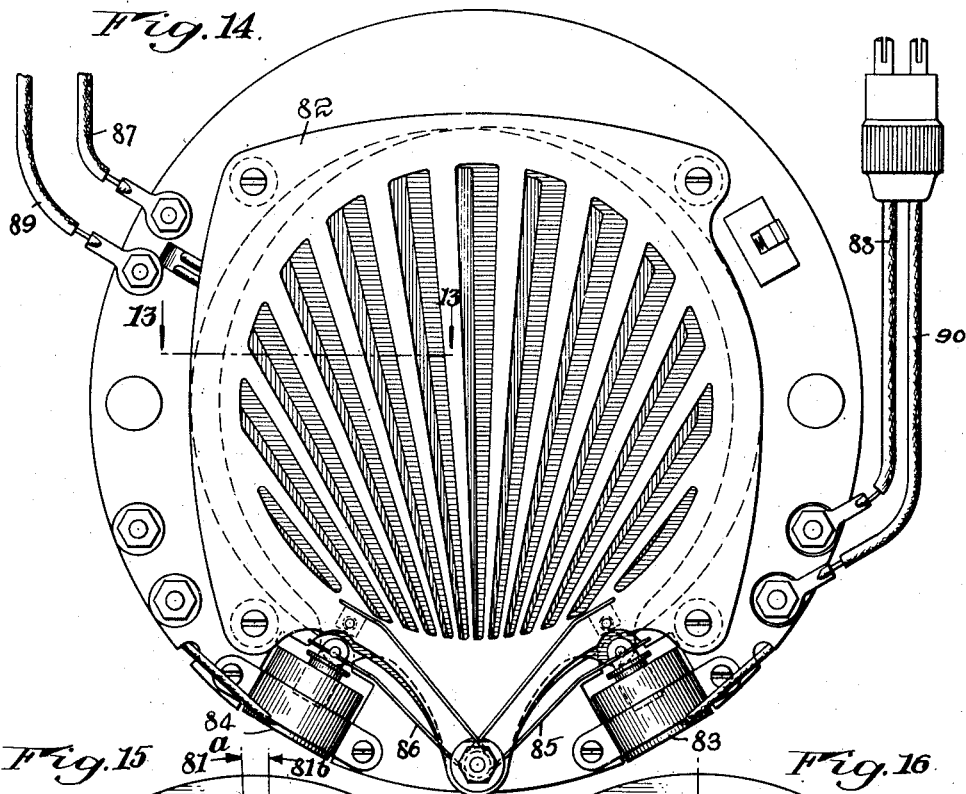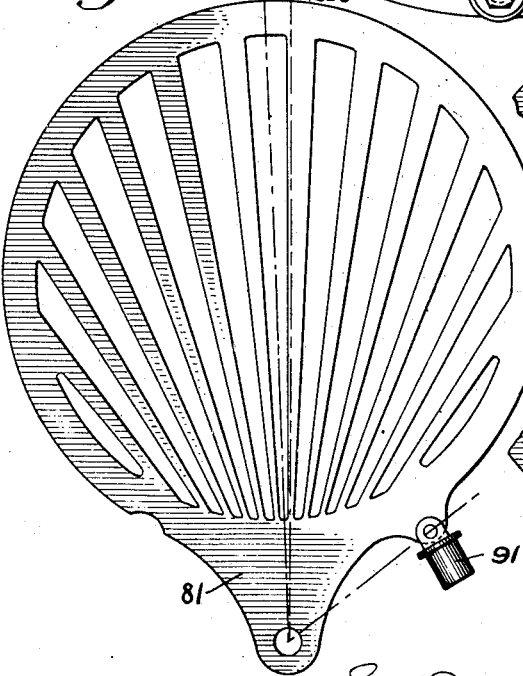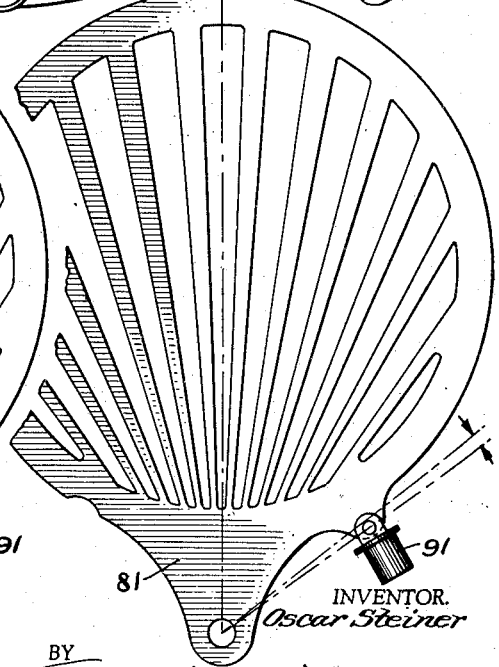

Inventor
Oscar Steiner

Oct. 18, 1949.   O. STEINER   2,485,119
AERIAL CAMERA WITH PHOTOELECTRIC MEANS RESPONSIVE
TO ILLUMINATION BOMB FOR OPERATING GRID SHUTTER
Filed June 20, 1945   8 Sheets-Sheet 8
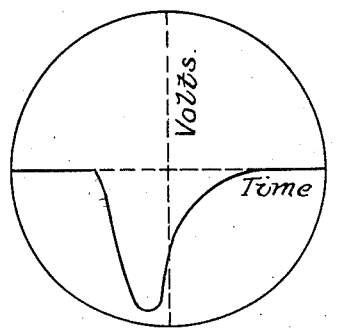
*Fig. 20.*
*Fig. 19.*
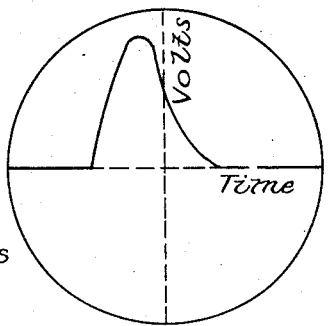
*Fig. 21.*
Potential At 111-112
Potential At 114
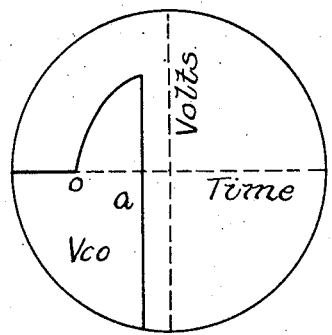
*Fig. 22*
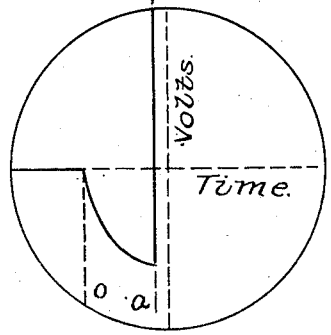
*Fig. 23.*
Potential At 119
Potential At 115
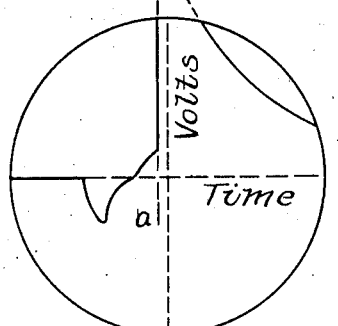
*Fig. 24.*
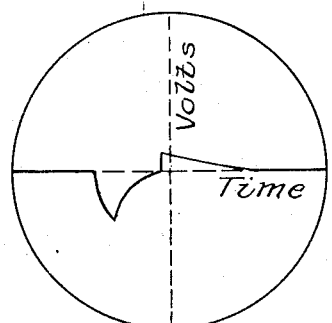
*Fig. 25.*
Potential At 124
Potential At 125
Inventor:
Oscar Steiner.
by
Emery, Booth, Townsend, Nichols and Louden. Attys Patented Oct. 18, 1949

2,485,119

UNITED STATES PATENT OFFICE 2,485,119

AERIAL CAMERA WITH PHOTOELECTRIC MEANS RESPONSIVE TO ILLUMINATION BOMB FOR OPERATING GRID SHUTTER

Oscar Steiner, Rochester, N. Y., assignor to Graflex, Inc., Rochester, N. Y., a corporation of Delaware Application June 20, 1945, Serial No. 600,636

2 Claims. (Cl. 95—12.5)

This application is a continuation-in-part of my co-pending application Ser. No. 523,818, filed February 25, 1944, and now abandoned, for method of and system for practicing aerial photography, particularly at night.

This invention relates to means for practicing aerial photography, particularly at night, when artificial illumination of the ground area to be photographed is required.

While it is broadly old in the art to actuate a camera shutter through the instrumentality of a photocell and an amplifier circuit, this has never been done with a shutter providing a large opening, such as three inches in diameter, when fully open, which shutter will open in at least five milliseconds, nor has such a shutter been controlled by an amplifier circuit that will respond only to a light impulse of a predetermined intensity but rising at a predetermined rate.

In order that the principle of the invention may be readily understood, I shall make explanatory reference to certain diagrammatic figures of the drawings and then set forth in detail two different cameras or photographic equipments by either of which my invention may be practiced.

Before proceeding to a description of the means for carrying out the steps involved in the practice of my invention, I will make brief reference to the figures of the drawings including the diagrammatic figures indicating the steps practiced, and precisely distinguishing the same, in accordance with section 4888 of the Revised Statutes, from what has heretofore been practiced and also including two cameras or photographic apparatus containing the means of my invention.

In the said drawings:

Fig. 1 is a graphic illustration or diagram indicating certain of the steps involved in the practice of my invention;

Fig. 2 is a diagram indicating the position of the airplane at the time the flash or illumination bomb is dropped, also the time when such bomb explodes, the area of illumination covered by the bomb flash and the area to be photographed by the camera, all in the practice of my invention;

Fig. 3 is a schematic view in front elevation of one type of camera and photographic equipment for practicing my invention;

Figs. 4 and 5 are details in elevation of means for adjusting the photocell to the proper trail angle;

Fig. 6 is a view similar to Fig. 3, but showing a different camera and photographic equipment, by which my invention may be practiced;

Fig. 7 is a side elevation of the camera shown in Fig. 6, indicating the driving motor and its connection to the camera, part of the lens cone being broken away to show the mounting of the grid or very fast-opening, so-called auxiliary, shutter;

Fig. 8 is a fragmentary detail partly in section, showing the motor controlled switch and means for locking it out of action;

Fig. 9 is a perspective detail of the switch control means that may be used in the practice of my invention;

Fig. 10 is a side elevation of the camera shown in Fig. 3 with the lens cone partly broken away to show the mounting of the grid or so-called auxiliary shutter therein;

Fig. 11 is a vertical section through the lens cone of the camera shown in Fig. 7, including the grid or so-called auxiliary shutter mounted therein;

Fig. 12 is a side elevation showing such grid or so-called auxiliary shutter removed from the camera;

Fig. 13 is a section on the line 13—13 of Fig. 14 showing the construction of the shutter leaves or grid plates of the grid shutter;

Fig. 14 is a front elevation of the grid shutter in closed condition;

Fig. 15 is a front elevation of one of the shutter grid plates in its closed position;

Fig. 16 is a view similar to Fig. 15 but showing such shutter grid plate in its open position;

Fig. 17 is a schematic circuit wiring diagram of the camera or photographic equipment shown in Fig. 6;

Fig. 19 is a graph illustrating the light-time characteristics of a typical flash bomb as used when making photographs with a camera in accordance with my herein disclosed invention;

Fig. 20 represents the screen of an oscilloscope showing the wave shape at points 111 and 112 hereinafter referred to;

Fig. 21 is a similar view but showing the wave shape on an oscilloscope screen at point 114;

Fig. 22 is a similar view but showing the wave shape on an oscilloscope screen at point 119;

Fig. 23 is a similar view but showing the wave shape on an oscilloscope screen at point 115;

Fig. 24 is a similar view but showing the wave shape on an oscilloscope screen at point 124; and Fig. 25 is a similar view showing the wave shape on an oscilloscope screen at point 125.

Figure 18:
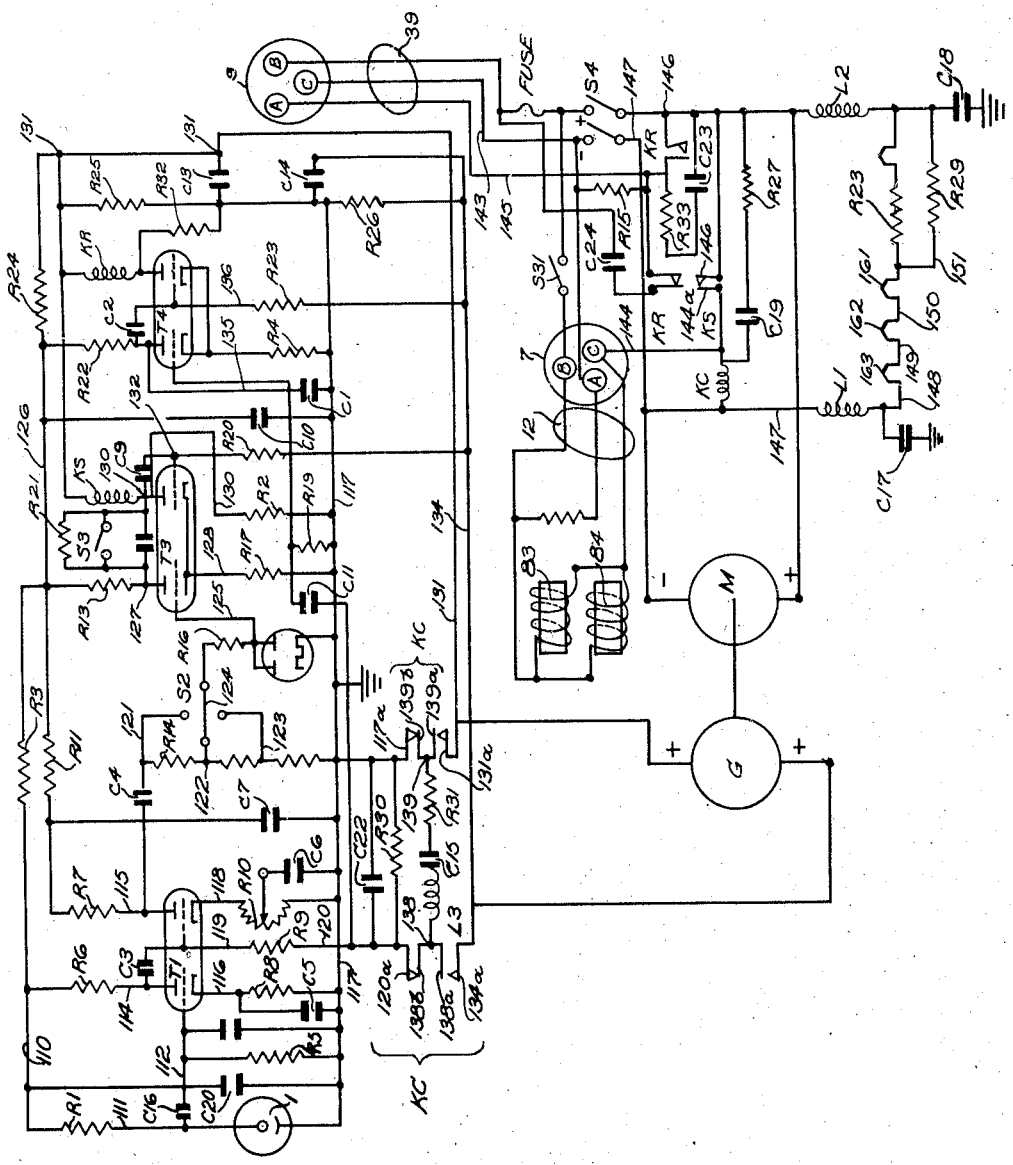
Fig. 18 is a diagram of an electrical amplifier circuit for controlling the opening of the grid shutter.

In the carrying out of my invention pertaining to aerial photography involving the artificial illumination at night of a selected ground area and the accurate photographing of that area at a certain precisely determined time, and more effectively and successfully than has heretofore been accomplished, a number of steps are involved, some of which may be referred to as preliminary steps, and the order in which those steps are practiced may be changed. The invention also includes certain main steps that must be practiced in a certain order, though two of such main steps may be said to merge one into the other. There is, in my Patent 2,345,365, dated March 28, 1944, also a final step which includes the automatic completion of an electrical circuit of the camera, causing it to recycle and thereby preparing it for a second exposure, which final step may nevertheless be regarded as a step in the practice of my invention.

Having determined what type of camera I will use in the practice of my invention, two of which cameras I have indicated in the accompanying drawings in Figs. 3 and 6 respectively (the first being what is known as a camera of the type K-24 and the second as of the type K-21), I apply to such selected camera a grid shutter such as disclosed and claimed per se in my said Patent 2,345,365, which shutter is particularly adapted for aerial photography and which grid shutter is positioned as shown in said patent and in the drawings hereof, particularly Fig. 11 (namely, just in advance of and very close to the objective lens of the camera). Briefly stated, such grid shutter is composed of a suitable plurality of grid plates each having transverse bars and intervening spaces, the important characteristic of such grid shutter being its capacity to open very quickly (i. e. in at least five milliseconds— $5/1000$ of a second), the shutter having a large opening when fully open (i. e. larger than three inches in diameter). The said opening three inches in diameter is only forty per cent obstructed by the grid bars when the shutter is fully open, and the unobstructed sixty per cent of the area of said opening provides a total open exposure area of 4.2408 square inches when the shutter is fully open. As a part of this step I connect such grid shutter to the panel control of the camera and I provide an operating electrical circuit having a relay therein.

The camera, whether it be of the K-24 or K-21 type, or of some other type, is normally provided with a focal plane shutter. In order to practice my invention I remove such shutter from the camera or I fix said focal plane shutter so that it will be in an open condition after the camera completes the rewind cycle and before exposure is made through the applied grid shutter. This is done by manipulation of the focal plane shutter reset knob, as stated in this specification.

I connect to a source of power and to the control panel of the camera the selected camera having such grid shutter and from which the focal plane shutter has been removed or fixed.

I select or determine the proper exposure time or shutter speed.

Whichever or whatever camera or photographic equipment is selected is provided with a sensitivity control indicated in Figs. 3 and 6. To carry out this step of my invention, I provide an electrical amplifier circuit for controlling a grid shutter, which circuit is responsive to a light impulse of a predetermined intensity, but rising at a predetermined rate, as will be subsequently described in detail and, as stated, I provide means for adjusting the sensitvity control of the circuit.

Whichever or whatever camera or photographic equipment is employed in carrying out my invention is provided with a photocell, not herein shown in detail, but the housing for which is indicated in both Figs. 3 and 6. What is known as the photocell trail angle is determined or calculated by the proper person whether that be the bombardier or another, and the photographer having charge of the camera is informed as to such angle and he sets or adjusts the photocell to the proper trail angle. In other words, the angular position of the photocell is established by turning, swinging, moving or adjusting the photocell as by means hereinafter described. The bisection of the photocell angle or included angle gives or indicates the trail angle, as will be evident from the detailed description.

The illumination bomb, the function whereof is to illuminate effectively the ground area that is to be photographed, is discharged and becomes ignited and when such illumination reaches about 50% of its intensity peak, the photocell functions. It will be observed that the step of discharging the illumination bomb and the step of adjusting the sensitivity control may merge one into the other (though separately effected), the purpose of the two steps being to cause the functioning of the photocell when the illumination bomb reaches about fifty per cent of the intensity peak thereof, but discriminating against a steady light on the ground, such as a burning area which has been bombed, or a slowly moving searchlight beam or daylight.

The final step of the invention which may be regarded as the preparation for the taking of the next photograph, is automatically to complete the circuit to the camera, thereby causing it to recycle, thus preparing it for a second exposure.

Having now briefly referred to the several steps involved in practicing my invention, I will more particularly refer to these steps and the disclosed means for carrying them out, and then I will refer in detail and as far as is necessary to the construction of the two cameras K-24 and K-21, either of which, among others, may be employed in the practice of my invention. It is to be understood that these two cameras are selected as representative merely of cameras or photographic equipments that, with the herein indicated changes, may be employed in the practice of my invention, and that other cameras or photographic equipments may be employed instead as the basic means for practicing my invention.

Heretofore it has been possible, but not with complete success and effectiveness, to make a photograph from the air, using a flash bomb and using a camera having a structure substantially the same as that indicated at 45 in Fig. 6, by the use of an intervalometer, such intervalometer causing the camera to start a cycle at a predetermined time after the flash bomb is dropped and causing the camera to recycle prior to a second exposure, after the flash bomb has exploded.

My invention herein claimed is carried out, so far as the present disclosure is concerned, by using either the camera indicated at 20, Fig. 3, or the camera indicated at 45 in Fig. 6. Other suitable cameras might be employed instead.

In either case or with any camera used in the practice of my present invention, I equip the camera with a grid shutter indicated merely in outline at 8 in Figs. 3 and 6 and in detail in Fig.

14, and subsequently herein fully described, the said grid shutter in Figs. 3 and 6 being marked "Night shutter."

In practicing the steps of my invention and as indicated in diagrammatic Fig. 1, the camera is operated by the flash from the flash bomb, to open a shutter in at least five milliseconds.

So far as I am aware the type of shutter referred to by me as a grid shutter, the details of which are shown in my said Patent 2,345,365, is the only shutter which will provide, when fully opened, an opening of at least three inches in diameter, and which will open in at least five milliseconds. The said opening three inches in diameter is only forty per cent obstructed by the grid bars when the shutter is fully open, and the unobstructed sixty per cent of the area of said opening provides a total open exposure area of 4.2408 square inches when the shutter is fully open. In the practice of my invention herein disclosed and claimed, it is relatively immaterial how long the shutter stays open and how long a time is consumed in closing the shutter, the essential thing being, as stated, that the shutter is opened fully in five milliseconds.

By removing the focal plane shutter of the camera that is employed in practicing my invention, or fixing such shutter so that it will be in open condition after the camera completes a rewind cycle and before an exposure is made through the grid shutter, and by equipping such camera at the proper place with my said grid shutter, which is positioned at the objective lens substantially as indicated in Fig. 11, the selected camera is thereby converted for the practice of my invention, the other necessary changes being herein indicated.

In the diagrammatic Fig. 2 certain steps are indicated in the carrying out of my invention. Therein, an airplane traveling from right to left is indicated at A, such airplane being equipped with one of the cameras selected and adapted for the carrying out of my invention. The lens of such camera is one which will cover a certain area of the ground which is to be photographed, depending upon the focal length of the lens and the altitude at which the plane is flying and which might be as high as 20,000 feet or as low as 3000 feet, or even much lower. If a relatively small illumination bomb is used at a definite altitude, say, 10,000 feet, a large camera aperture is necessary. If the illumination bomb size is increased, the altitude could be increased proportionately or a smaller aperture could be used if the photographing is done at an altitude of substantially 10,000 feet.

The ground area to be photographed is represented by broken lines marked "Lens angle," the area to be photographed being indicated by those words. The airplane traveling from right to left releases the illumination bomb when the airplane is in the position indicated by dotted line at the right, and such bomb will in falling take a path roughly indicated by the broken curved line B, as will be understood, and when such bomb reaches the point C it becomes ignited and explodes. A line F projected from the center of the camera (when the airplane as indicated in solid lines is over the area to be photographed) and passing through the bomb at the time the bomb explodes is known as a trail angle, and in the carrying out of my invention it is known as the photocell trail angle.

I provide a photocell and its associated amplifying means, but it is unnecessary to disclose such photocell in detail, the housing thereof, including the amplifying means, being indicated at 1 in Figs. 3 and 6, and the amplifier circuit being shown in Fig. 18.

What the photocell "sees" is termed the photocell angle and in the diagram Fig. 2 is the angle included between the broken line D and the broken line E. The bisecting of such included angle D, E, gives the trail angle or photocell trail angle, and is indicated by the broken line F. The obtaining of the trail angle is involved in the adjusting of the photocell and, as stated, the trail angle is determined or calculated by the proper person or in the proper way and the photographer to whom such angle is given sets the photocell to such determined trail angle.

The illumination bomb becomes ignited and explodes at the point C, which is on the trail angle indicated at line F, which is a line projected from the center of the camera in the airplane through the bomb at the time it explodes. The bomb when it explodes will illuminate the area marked "Area to be photographed," and the camera will photograph that area within the cone of the lens angle.

In carrying out my invention, the sensitivity control must be adjusted, and the control knob for such sensitivity is indicated at 2 in Figs. 3 and 6, the amplifier circuit controlled by the knob 2 being diagrammatically shown in Fig. 18. The position of the control knob 2 is determined by the size of bomb used and the altitude at which the airplane is flying.

I properly manipulate a switch handle indicated at 3 in Figs. 3 and 6, which switch handle controls a switch that in turn controls the exposure time. The intervalometer receptacle with which the selected camera must be provided is indicated at 5 in Figs. 3 and 6. The panel 6 is also provided with a shutter control receptacle indicated at 7 in Figs. 3 and 6.

In carrying out my invention, when making a photograph with a camera of the K-24 or K-21 type, the focal plane shutter thereof having been removed or fixed and the described grid shutter 8 having been attached as as indicated in Figs. 7, 10 and 11 and the photocell housing being adjusted for the proper trail angle and being connected to the control panel 6 of the camera, the camera itself is connected to the control panel through the plug 9, the grid shutter is connected to the control panel 6 by the plug 10, the switch 4 is adjusted to the on-position as indicated in Fig. 3, the exposure time is selected and fixed by the manipulation of the switch 3 and the sensitivity control 2 is adjusted to obtain the proper sensitivity of the herein subsequently described amplifier circuit, so that the photocell circuit will be operated when the illumination bomb is ignited and reaches approximately 50% of its peak intensity, and not until such proportion of the peak intensity is reached.

The camera is now in condition for operation, assuming that a sensitized area of film is properly in place, and it will be assumed that the airplane carrying the camera is in the air and the position has been reached for making the photograph. The flash bomb is released in any one of the several well known ways, and as it reaches a predetermined point depending on the adjustment of the flash bomb fuse, the bomb will explode.

Referring to diagrammatic Fig. 1, the vertical line G represents the point at which the illumination bomb starts to explode. As the light intensity of the flash builds up to a point indicated by the broken line H, as determined by the herein subsequently described amplifier circuit, the photocell will pick up light from the bomb and the light energy acts through cable 11 (Figs. 3 and 6) to the control panel 6, and through an amplifier which will operate a relay closing a circuit to the grid shutter 8 through the cable 12 of Figs. 3 and 6.

The said relay is of a delayed action type which will cause a circuit to the grid shutter 8 to be continued for a definite time depending on the position of the switch lever 3 (that is, for say 1/25 or 1/40 of a second). After the expiration of this time the relay will be caused to open, thus closing the grid shutter 8 because the electric circuit to the latter has been opened. As the circuit to the grid shutter 8 is opened, a circuit will be completed to the camera, and this will cause the camera to recycle, thereby preparing it for a second exposure.

The time at which the shutter closes is represented by broken line I in diagrammatic Fig. 1, and the time at which the camera recycles is indicated by the broken line J in said Fig. 1.

It is possible, in carrying out of my invention, to convert several well known cameras to full automatic photocell control provided I equip such camera with the so-called grid shutter shown in my said Patent 2,345,365, and as shown in Fig. 11 hereof, and I can quickly reconvert such camera for use for day photography or for use in carrying out one of the older but less satisfactory methods of night photography.

In Fig. 18 I have diagrammatically illustrated and I will subsequently herein describe the preferred amplifier circuit responding to a light impulse of a predetermined intensity but rising at a predetermined rate, thus preventing the opening of the grid shutter by the action of a steady light on the ground, such as a burning area which has been bombed, or a slowly moving searchlight beam.

I will now by reference to Figs. 3 to 17 of the drawings of this application, describe both of those two types of cameras K-24 and K-21 in detail, and I will specify in detail the changes necessary to be made in each of them by me in order to adapt such types of cameras for use in practicing my invention, and particularly with respect to the steps involving photocell adjustment and the novel function of and results secured by the use of the grid shutter.

Referring first to Fig. 3 of the drawings, an aerial camera is indicated generally at 20 which is of a construction substantially the same as that disclosed in British Patent 334,637, and the camera shown upon a larger scale in Fig. 10 of the drawings of this application is substantially the same as the camera shown in the said British patent. The camera of said British patent as actually manufactured has added thereto certain features or has had certain changes made therein. The camera shown in Fig. 3 of the drawings of this application represents the camera of said British patent as so changed and as manufactured in the United States. The description of the structure of the said British patent in so far as the same will be herein referred to is general enough to cover the United States adaption of such camera and is here given for the purpose of disclosing how such type of camera may be used in the practice of my invention herein claimed if such camera be changed as hereinafter referred to so as to carry out the steps of my present invention.

Still referring to Fig. 3 of the drawings hereof, there is attached to the camera 20 a driving motor 21, an intervalometer receptacle 22, a power receptacle 23 and a lens cone or hood 24 provided with a bracket 25 for supporting the photocell housing 1 already referred to at length as playing a very important part in the carrying out of my invention.

As indicated in Fig. 3 and as further shown in Figs. 4 and 5, the photocell 1 is provided with a bracket 27 that is adjustable in a rotary direction with the bracket 25 and is adapted to be locked in any selected position of adjustment by means of a clamp 28 which, as best shown in Fig. 5, is threaded onto a short shaft or hub 28a projecting from the photocell housing 1. In order to adjust the photocell housing the clamp 28 is turned manually sufficiently to loosen the same with respect to the bracket 25 and when the desired adjustment is made the clamp 28 is tightened manually in the proper position.

The camera shown in Fig. 3 of the drawings is normally equipped with a focal plane shutter, and in order to permit my invention to be carried out, I apply to such camera close to the objective lens thereof, and as diagrammatically indicated in Fig. 5 hereof, what I term a grid shutter, which is specifically disclosed in my said Patent 2,345,365, and I remove from the camera the focal plane shutter or I so fix said focal shutter that it will be in the open condition after the camera completes a rewind cycle and before exposure is made through the applied grid shutter.

The grid shutter is composed of a plurality of grid plates each having transverse bars and intervening transverse spaces, such grid shutter having a capacity to open in at least five milliseconds—5/1000 of a second, such grid shutter having, when fully open, an opening larger than three inches in diameter. The said opening three inches in diameter is only forty per cent obstructed by the grid bars when the shutter is fully open, and the unobstructed sixty per cent of the area of said opening provides a total open exposure area of 4.2408 square inches when the shutter is fully open. The details of such grid shutter are sufficiently shown in Figs. 11 to 16 of this application and will be presently described.

Referring further to the general details of the camera shown in Fig. 3, the control panel for controlling the operation of the camera is indicated generally at 6, and it is equipped with a switch 31 for controlling the heater that is desirably built into the grid shutter or its support and which constitutes no part of the present invention.

The sensitivity control knob for controlling the amplifier circuit diagrammatically represented in Fig. 18, and the control position of which is determined by the size of bomb used and the altitude at which the airplane is flying, is indicated at 2 and a switch handle is indicated at 3 for controlling a switch that itself controls the exposure time. A switch is indicated at 4 for controlling the electrical circuit to the photocell and the amplifier control means. A receptacle is indicated at 35 to provide a circuit to the photocell through a plug 36, the cable 11, previously referred to and a plug 38. Normally the plug 36 is connected to the receptacle 35 and the plug 38 is connected to a suitable receptacle (not shown) and also to the photocell housing 1. Leading from the control panel 6 is a cable 39 that is provided with a receptacle 9 normally connected to the said intervalometer receptacle 22. The said panel 6 is also fitted with a second receptacle known as the shutter control receptacle which is indicated at 7, normally connected to which is a plug 42 connected to the wire or cable 12 previously referred to, and the opposite end of which has the plug 10, previously referred to, and which is normally connected to the grid shutter 8, merely diagrammatically indicated in Fig. 5 as well as in Fig. 6 and bearing the notation "Night shutter."

The equipment shown in Fig. 6 is generally similar to that shown in Fig. 3, and wherever the same numerals occur upon Figs. 3 and 6, they indicate the same parts. The camera indicated in Fig. 6 is, however, the camera known as the K-21 aerial camera, the structure whereof is substantially the same as that disclosed in United States Patent 2,371,592, dated March 13, 1945, to Gorey, Nadel, Nitsch and myself.

The control panel shown in Fig. 6 is exactly the same as that shown in Fig. 3 and the photocell mounting bracket for the photocell housing is the same as that shown in Figs. 3, 4 and 5. The grid shutter 8 indicated in Fig. 6 by the notation "Night shutter" is the same in structure as the grid shutter described in connection with Fig. 3 and shown in detail in Figs. 11 to 16, being located close to the objective lens.

The camera known as aerial camera K-21 merely diagrammatically indicated at 46 in Fig. 6 and is equipped with intervalometer receptacle 5 into which the plug 9 is normally fitted. Such camera also has a receptacle 47 to which is connected a motor plug 48 by means of cable 49, as indicated in Fig. 7. A third receptacle 50 is also attached to the camera, being connected to the power supply. The camera is provided with a lens cone 51 having attached thereto in a manner already described the photocell support bracket 25 and also a lens shield 52. The camera is provided with a manually operated button 53, a shutter control knob 54 and a day and night cycle control knob 55. In Fig. 7, there is indicated a drive motor normally attached to the airplane carrying the camera. A flexible cable housing 57 transmits power from the motor to the camera through a drive shaft 58 having fitting 59. There is provided, as indicated at 60, a window through which to observe the setting of the applied focal plane shutter.

I have sufficiently indicated in Fig. 8 the motor control switch for the camera drive mechanism, such switch being shown at 61 as attached to the camera housing by screws 62, 62. Such switch is normally operated by a pin 63 following a cam plate 64 and the movement of the pin 63 to the right or to the left as controlled by a notch 65 of said cam plate 64 operates the switch contacts for controlling the motor circuit. Since a full description of the operation of the switch and of the mechanism just referred to is not necessary to a disclosure of my present invention, being disclosed in said United States Patent 2,371,592, such switch and mechanism need not here be further described excepting to set forth that for the carrying out of the photocell-controlled night cycle, it is necessary to hold said switch in such a position that the notch 65 of the cam plate 64 will not stop the motor when said notch reaches the pin 63, inasmuch as said pin 63 is prevented from moving in a right-hand direction by means of a slide 66, shown most clearly in detail in Fig. 9 and in dotted lines in Fig. 8 and in dotted and solid lines in Fig. 7. The switch cover plate 67 is provided with an elongated slot 68 through which passes a lock nut 69 engaging a threaded hole 70 of the slide 66. When operating on the photocell control cycle the slide 66 is moved to the left after the lock nut 69 has been loosened. Then the lock nut 69 is tightened, thereby holding the slide 66 in the position shown in Figs. 7 and 8.

Referring now to Figs. 7 and 11, the lens cone 51 is represented in Fig. 7 as partly broken away to show more clearly the mounting of the grid shutter 8 which, as stated, must be applied to the camera in order to adapt it to the carrying out of certain of the steps of my invention. In Fig. 11, the lens cone 51 is shown in section so as clearly to show the lens barrel 71, provided with an enlarged cylindrical flange 72 to which is fitted such grid shutter 8.

The said grid shutter 8 has a cylindrical part 73 provided with a flange 74 fitted into a diametrically enlarged part 72 of the lens barrel 71. The cylindrical part 73 is provided with a series of inverted L-shaped openings 75 engaged by an equal number of screws 76 threaded into the enlarged cylindrical flange 72 of the barrel 71 so as thereby to hold the shutter to the lens barrel. One of the screws 76 projects inwardly so as to be engaged by the opposite end of a lever 77 to prevent the grid shutter assembly dropping off the lens barrel 71.

While the grid shutter is subject to structural changes or modifications within the scope thereof, I have shown in Figs. 12 to 16 the preferred structure thereof, and I will now sufficiently describe the same, which is so far as I am aware the only shutter for practicing that step of my invention which involves fully opening the shutter in at least five milliseconds to present an opening at least three inches in diameter.

Referring to the precise structure of the grid shutter herein illustrated, it will be noted that the shutter is provided with five grid plates, of which an inner, stationary, protecting grid plate is shown at 78, an inner, movable, grid plate at 79, a central, stationary grid plate at 80, an outer, movable, grid plate at 81, and an outer, stationary, protecting grid plate at 82.

The grid shutter is represented in a closed condition in Figs. 13 and 14. When the shutter is operated, the movable grid plate 79 is moved to the left, so as to be exactly behind the protecting grid plate 78, and the forward movable grid plate 81 is moved to the right to be exactly behind the forward, stationary, grid plate 82. In this position, all of the bars of the several grid plates are in exact superposed condition and the light passes through all of the spaces between the bars of the grid plates. In such superposed position of the bars the shutter is open, and when the movable grid plates are shifted to the position shown in Figs. 13 and 14, the shutter is closed. When the shutter is opened the opening is at least three inches in diameter. The said opening three inches in diameter is only forty per cent obstructed by the grid bars when the shutter is fully open, and the unobstructed sixty per cent of the area of said opening provides a total open exposure area of 4.2408 square inches when the shutter is fully open.

Referring now to Figs. 14, 15 and 16, representing the grid shutter as removed from the camera and shown in closed condition in Fig. 14, it is to be understood that the grid plate 81 is caused to be moved in a right-hand direction viewing Fig.

14 by a solenoid 83, and the grid plate 79 is caused to be moved in a left-hand direction by a solenoid 84 when said solenoids are energized. The said grid plates are returned to their closed position when the said solenoids are de-energized by the action of springs 85, 86, which need not be more specifically referred to.

A requisite of the shutter or of any shutter to be employed in carrying out certain steps of my herein claimed invention is that of fully opening in at least five milliseconds—5/1000 of a second—and in so doing providing an opening more than three inches in diameter. The length of time that such grid shutter remains open and the length of time required to close the said shutter are not essential steps in the practice of the invention herein claimed, but it is essential to the practice of my invention that the shutter shall not begin to open until the illumination reaches approximately fifty per cent of its peak intensity and that the shutter then fully opens in at least five milliseconds.

Referring again to Fig. 3 of the drawings, the cable 12 is shown as connected to the grid shutter 8 (therein marked "Night shutter" and said cable contains three wires. Referring now to Fig. 14, one of said wires is a common wire connected with a wire 87 of the heater circuit and the other connects to a wire 88 of the magnetic solenoid circuit.

In Figs. 15 and 16 there is shown a detail of the movable grid plate 81. The center line 81a indicated on Fig. 15 is shown as displaced from the true center line 81b when the shutter is in closed condition, but in Fig. 16 the said two center lines are superposed, since the shutter is then in its open condition. In Figs. 15 and 16, the movement of the solenoid armature 91 is clearly indicated.

I have in Fig. 17 shown the wiring diagram of the K-21 aerial camera that is shown in Figs. 6 and 7, and I will now specifically refer thereto.

The wires 92 and 93 are connected to the power receptacle 50 and the wires 94 and 95 are connected to the motor receptacle 47.

The wires 92, 93 and the wire 96 are connected to the intervalometer receptacle 45, and the wires 97 and 98 are connected to a signal light receptacle 99. The motor switch 61 is the main motor-controlled switch previously referred to, and the motor-controlled switch cam is indicated at 64 as in Fig. 8. Such switch 61 will normally be as shown in solid lines in Fig. 17 when the camera is stopped, when set for a normal cycle, but when the slide 66 is moved to the position shown in Fig. 8, such switch 61 will occupy the position shown in dotted lines, Fig. 17. Thus the complete control of the camera will be provided by a switch 100 that is controlled by the camera capping gates, as fully disclosed in my own co-pending application Ser. No. 517,186, filed January 6, 1944, now Patent No. 2,393,575. When the said switch 100 is in the condition shown in Fig. 17, the motor will be caused to operate, but when the switch arm is moved to the right by a hook 101 of the capping-gate-controlled mechanism, the said switch 100 will be opened, and the camera will be stopped and will remain stopped until said switch 100 is released by current flowing through a solenoid 102, thereby disengaging the hook 101 from the switch operating means and completing a circuit to the motor control relay solenoid 103 that in turn controls motor switch 104, thus completing a circuit to the motor through the receptacle 47.

The said grid shutter employed in carrying out a vital step or steps of my invention is one wherein the area and shape of the corresponding bars and unobstructed openings of all the grid plates thereof are respectively the same, and wherein when the said grid shutter is fully open the said bars are accurately superimposed, and of the entire area within the rim of each such grid plate forty per cent is occupied by the superposed bars and sixty per cent by the openings of such grid plate.

In Fig. 18 I have diagrammatically represented an amplifier circuit for controlling the grid shutter. The disclosed circuit is not per se, nor as to the details thereof, my invention, but as to the assembled details thereof, it was built at my request and is herein disclosed by me to constitute one embodiment of means used in carrying out a step novel with me in the novel combination of steps of my invention herein disclosed. For such circuit might be used any other amplifier circuit (if there be such) having essentially the same characteristics as the amplifier circuit shown in Fig. 18, so as to cause the shutter to be operated by a photocell only in the presence of a light having a predetermined intensity and a determined rate of increase, and then only to cause the shutter to operate at a predetermined point in the rise of light intensity.

In Fig. 17, certain of the wires have been marked $a$, $b$ and $a$, $b$, $c$, so that the diagram in Fig. 18 may be traced to the diagram of the camera circuit in Fig. 17. In the diagram Fig. 18, there are shown the wires extending to the solenoids 83, 84 of the grid shutter and to the heater coacting with said grid shutter.

Referring to Fig. 1, the point at which the light acts to open the grid shutter, and which in Fig. 1 is indicated by the line H, is controlled by the sensitivity control knob 2. The position of said control knob 2 will be determined by the size of bomb used and the altitude at which the airplane is flying.

Referring to Fig. 18, the circuit may be widely modified by selecting different components, such as vacuum tubes, resistors, condensers, etc. of different values. Any other amplifier having essentially the same characteristic as set forth herein for the amplifier circuit of Fig. 18 can be used instead.

The following is the principle of operation upon which the action of the herein disclosed photoelectric night-camera shutter assembly depends. The photoelectric cell 1, when acted upon by the light from the flash bomb, sets up an electric impulse which is enlarged by the amplifier circuit, and by means of a suitable relay such impulse opens the grid shutter prior to the peak intensity of the flash and closes it after an interval of $\frac{1}{25}$ or $\frac{1}{40}$ of a second as predetermined by the selected setting of the controls. The details of the means by which this is accomplished will now be set forth.

The following description of operation refers to the circuits and appearing on the elementary wiring diagram, Fig. 18. It is assumed in the following description that the switch indicated at 4 in Fig. 6 and indicated at S4 in Fig. 18 is in closed condition, it being shown in open condition in Fig. 18 and in closed position in Fig. 6. All voltages referred to, 111, 115, 119, etc., refer to potential with respect to ground at points 111, 115, 119, etc., as designated on the elementary wiring diagram, Fig. 18. The various components are referred to by the same symbol designations given them on the elementary diagram (R1, C16, T1, KC, etc.).

A pulse of light reaching the photocell 1 (Figs. 3, 4, 5, 6) causes the cathode of such photocell 1 to emit electrons, resulting in a current through and a greater consequent voltage drop across (R1, Fig. 18). The voltage at point 111 decreases and the voltage at point 112 (on the other side of C16 in Fig. 18) becomes negative. When the light pulse has reached its peak intensity and returned to zero, the voltages at points 111 and 112 return to their quiescent values. Figs. 19 and 20 represent the light intensity at the photocell and the voltages of 111 and 112, respectively. These values are platted versus time.

Both triode elements of tube T1 (Fig. 18) are conventional resistance-capacitance coupled-voltage amplifiers. Gain is controlled in the second stage of tube T1 by means of a potentiometer (R10, Fig. 18). This potentiometer serves two purposes. First, it maintains a constant D.-C. bias because its total resistance is between the cathode and the ground. Second, its movable contact provides degeneration of varying A.-C. impedance between the cathode and ground. When the knob R10 (not shown) is turned to its clockwise limit, Fig. 18, C6 is directly connected to cathode and ground and the gain is maximum. Fig. 21 shows the voltage at point 114.

It will be noted that potentiometer R10 is for use in the calibration of the circuit and when once adjusted it should not be necessary to be readjusted through the normal operation of the apparatus.

The voltage at point 115 (Fig. 23) resembles very closely the inverse of the wave shape of the light pulse until time $a$ is reached.

At time $a$ a strong negative voltage is applied to the grid 119 of the triode T1, Fig. 18 due to functioning of the control relay KC. As the grid becomes negative, it passes through its cut-off voltage. No more current flows from point 118 to point 115. Hence, there is no drop across R7 and R11, so that the potential at point 115 rises to the B+ voltage (126) as rapidly as the decoupling condenser C7 can charge through R11. The amplifier is now dead and will pass no more signals. The voltage at point 119 reaches a maximum negative value and then immediately begins to increase exponentially in a positive direction until it again passes through the value $co$, that is, the cut-off potential of the triode. At this instant, current again flows from point 118 to point 115, and the voltage at point 115 resumes its quiescent value as the voltage at point 119 returns to zero. The amplifier is again alive.

Point 124 is coupled to point 121 through a capacitor C4 and a voltage dividing network consisting of R12, R13 and R14. The time constant of this coupling circuit is so short that C4 charges and discharges almost as rapidly as point 115 changes its value when the photocell 1 receives a light pulse from the flash bomb. A short time constant is employed to make the photoelectric shutter control herein disclosed discriminate against light whose intensity changes slowly. Hence, steady light such as a burning area which has been bombed, a slowly moving searchlight beam or daylight will not cause the photoelectric shutter control herein disclosed to operate if the sensitivity switch knob 2 is set properly, which knob is indicated at 2 in Figs. 5 and 6 and at S2 in Fig. 18.

The twin triode T3 is used as a multivibrator to control the relay KS which operates the grid shutter through contacts 144a and 146a which control the circuit to solenoids 83 and 84, herein disclosed. The first triode element normally conducts current, and the second triode element is normally non-conducting. The coil of the relay KS, which operates the shutter through the contacts 144a and 146a is in the plate circuit of the second triode element of tube T3. The period of the shutter multivibrator is (0.034+0.010) second when switch 3, Fig. 6, and indicated as S3 in Fig. 18, is in the $\frac{1}{25}$ position (closed) and (0.019+0.005) second when S3 is in the $\frac{1}{40}$ position (open). The shutter multivibrator operates as follows:

Initially, the voltage at point 125 is negative with respect to the voltage at point 128 since the voltage at point 125 equals approximately zero and point 128 has a positive value. This bias voltage determines the normal value at point 127. The voltage at point 132 is negative with respect to the voltage at point 128 to the extent that the second element of tube T3 is conducting no current. The voltage at point 132 is at the same potential as point 134, the bus which is always approximately $--20$ volts with respect to ground. The voltage at point 130 is equal to the voltage at point 131 because there is no current flowing through the KS coil. Let it be supposed that S3 is closed. A negative voltage pulse is applied to point 125. Less current flows from point 128 to point 127. The drop in R18 decreases and the voltage at point 127 increases. The voltage at point 132 increases to $co$, that is the cut-off potential of the triode, and current begins to flow from point 128 to point 130. Hence, the drop across R17 increases, and the voltage at point 127 goes still higher. This process continues until no current flows from point 128 to point 127, the voltage at point 127 equals the voltage at point 126, and the current from point 128 to point 130 reaches its maximum values. The control relay KS closes its contacts 144a and 146a. When C9 has charged for .034 second, the voltage at point 132 drops to the cut-off voltage for the second triode, and relay KS opens its contacts, the drop across R17 decreases to its normal value, and the voltage at point 127 returns to its normal value. The voltage at point 132 is driven very negative, and recovers to its normal value at an exponential rate as C9 discharges.

If a positive pulse on point 125 had followed the negative pulse, this positive pulse could have caused the multivibrator to turn off before its natural period was completed. This explains why T2, a diode tube, is included in the circuit. Fig. 24 shows voltage at point 124. At time $a$, the voltage applied to kill the amplifier at point 119 causes a positive surge of voltage to appear, following the negative voltage due to the flash bomb light at the photocell 1. When the negative pulse through C4 is impressed on point 124, no current will flow through tube T2, so that there is no drop through R16, and the voltage at point 125 equals the voltage at point 124. When the voltage at point 124 returns from its negative maximum to zero and begins to go positive, tube T2 begins to conduct. The impedance of tube T2 is very small compared to that of R16, so the positive swing of the voltage at point 124 appears as a drop across R16, and 125 remains approximately at zero while the voltage at 124 is positive.

The amplifier killing voltage was obtained through the function of the control relay KC. The coil of relay KC is across the shutter circuit and is operated by the KS relay. When tube T3 "fires," KS picks up, closing contacts 144a and 146a, causing the grid shutter to open, because a circuit has been completed to solenoids 83 and 84, and causing KC to pick up. When KC picks up, it causes contacts 134a—138a, and 131a—139a, and opens contacts 120a and 138b, and 139b and 117a, placing the condenser C15 across the dynamotor high voltage output. (R31 and L3 are included in the circuit to suppress current and high frequency transients when C15 is switched back and forth in the circuit.) When tube T3 has timed out, KS drops out, the shutter closes, and KC drops out, closing its normally closed contacts 120—138 and 117—139. C15 now discharges through R30 and R31. As R31 is very small compared with R30, the voltage drop due to the discharging current of C15 appears almost entirely across R30. This negative voltage is impressed on the grid (point 119) of tube T1 through a grid-leak resistor R9. C22 serves to suppress transient voltages that would otherwise appear at point 119 as a result of closing of the normally closed contacts on relay KC. These contacts close when the KS relay drops out and the grid shutter closes as described above.

The killing voltage is also fed through a coupling condenser C11 to the first grid of tube T4. T4 is a multivibrator operating in the same manner as tube T3. Tube T4 controls the KR relay which, in turn, gives a voltage (0.2+0.01 second in duration) to the camera motor, because of the closing of the KR relay contacts completing a circuit to the camera from wire 146 to wire 145, and causing the film to be advanced. A capacitor (C1, Fig. 17) connected between the first plate (point 135) of tube T4 and ground, keeps tube T4 from firing immediately. This time delay is roughly in the order of 0.050 second, and the period of tube T4 functioning is (0.200±0.100) second. The filaments of the several tubes T1, T2, T3 and T4 are connected as follows: From point 146 through the inductance L2 through wire 153 to filament 160 through wire 152 through a resistor R28 to filament 161, wire 150, filament 162, wire 149, filament 163, wire 148, inductance L1, into point 147. Inductances L1 and L2 and condensers C17 and C18 constitute a filter across the line—that is, across point 146 and point 147. The resistors R28 and R29 are used properly to govern the current flowing through the several filaments. The condenser C19 and the resistor R27 constitute a filter across the contacts KS of the relay KS. The condenser C23 and the resistor R33 constitute a filter across the contacts KR of the relay KR.

In operation, the plug carrying the cable 39 is plugged into the receptacle 22 of the camera (Figs. 5 and 6), thus completing a circuit to the camera, as shown in Fig. 17, wherein point A of plug 9 is connected to wire 92 and point B of plug 9 is connected to wire 93, and point C of plug 9 is connected to wire 96 of the receptacle 22 that is carried by the camera.

I provide such a sensitivity control of the act of opening the said grid shutter by the action of a photoelectric cell that the photoelectric cell is not responsive to and hence does not act to open the grid shutter in the presence of a steady light on the ground, such as a burning area which has been bombed, or a slowly moving searchlight or even daylight, but is responsive only to a light impulse of predetermined intensity emanating from an illumination bomb discharged from the airplane carrying the camera, and which light impulse is rising at a predetermined rate and has reached substantially fifty per cent of its maximum.

In the prior art, photoelectric cells were, employed to cause an ordinary shutter to function (that is, to open and close), but there was no means in such prior art practices to render the photoelectric cell immune to the action of any light ray whatsoever of sufficient intensity that might reach it. My own researches and investigations have convinced me that it is essential to success in practicing night aerial photography for the purpose herein set forth, that I should provide something non-existent in the prior art, so far as I was aware, namely, a photocell and amplifier circuit that would respond only but surely to a light impulse of a predetermined intensity, rising at a predetermined rate. I caused such an amplifier circuit to be provided for my use in completing and rendering my invention operative in accomplishing the objects of my invention, and I have fully disclosed such amplifier circuit herein, and I have explained how certain light impulses, above defined, cause the solenoids 83 and 84 of the grid shutter to function to open the grid shutter in five milliseconds and expose a three inch diameter of lens.

My invention is practiced by the organization or structure shown in Fig. 3 or that shown in Fig. 6. In both of said structures the solenoids controlling the grids of the grid shutter marked "Night shutter" are electrically connected to the panel 6 at the receptacle marked 7 for the shutter, and the photocell 1 is electrically connected to the panel at the receptacle marked 35. The sensitivity control marked 2 of the panel 6 is turned at the proper time and in the proper direction and to the proper extent, in accordance with the size of bomb used and the altitude at which the plane is flying when a bomb is to be discharged from the airplane carrying the organization or structure of Fig. 3 or Fig. 6.

My invention includes the system or mechanism herein described and illustrated including as one structural feature thereof, but only when associated with the other structural features thereof, an amplifier circuit responding only to a light impulse of predetermined intensity and rising at a predetermined rate, and which mechanism has sensitivity control means by which the response can be made only when the illumination has reached a predetermined proportion of the intensity peak of the illumination bomb light, such as substantially fifty per cent thereof.

My invention has been extensively and successfully used by the United States Air Service.

Having thus described at length the steps of my invention and having disclosed two types of cameras and their equipments, each having the grid shutter of my invention applied thereto by me for the suitable carrying out of steps of my herein claimed invention, and having carefully distinguished my invention from those heretofore practiced, it is to be understood that although specific terms are employed, they are used in a generic and descriptive sense and not for purposes of limitation, the scope of the invention being set forth in the following claims.

I claim:

1. Means for photographing a selected ground area from an airplane at a time requiring the artificial illumination of such ground area, including the following, in combination: an airplane-carried camera having as its only functioning shutter a grid shutter positioned at the objective lens, and composed of a plurality of grid plates each having grid bars and intervening spaces, which areas constitute sixty percent of the area within the rim of the grid plates, and thereby providing, when said grid shutter is open, an exposure lens aperture at least three inches in diameter and having, when open, a total open exposure area of substantially four square inches and capable of opening fully in five milliseconds of time; solenoids operatively connected to said grid plates for opening the same in such period of time to said full opening of substantially four square inches; a photoelectric cell mounted in operative relation to the camera so as to respond only to the light of an illumination bomb dropped from the airplane carrying said camera; and an amplifier circuit and sensitivity control means interposed between and operatively connected with said photoelectric cell and with said grid plate solenoids, rendering said photoelectric cell and amplifier incapable of causing said solenoids to open said grid plates because of steady light on the ground, such as the light from a burning ground area that has been bombed, but permitting and causing the full opening of said grid plates to present an open exposure area of substantially four square inches, through the action of said solenoids, but only in response to an intense light impulse from an illumination bomb acting upon said photoelectric cell, and which light impulse is of a predetermined great peak intensity and is rising at a predetermined rate toward its peak intensity and which functions to cause the full opening of said grid plates only when the light intensity from the illumination bomb has reached a predetermined point in its rise.

2. Means for photographing a selected ground area from an airplane at a time requiring the artificial illumination of such ground area, including the following, in combination: an airplane-carried camera having as its only functioning shutter a grid shutter positioned at the objective lens, and composed of a plurality of grid plates each having grid bars and intervening spaces, which areas constitute sixty percent of the area within the rim of the grid plates, and thereby providing, when said grid shutter is open, an exposure lens aperture at least three inches in diameter and having, when open, a total open exposure area of substantially four square inches and capable of opening fully in five milliseconds of time; means connected to said grid plates for opening the same in such period of time to said full opening of substantially four square inches; a photoelectric cell mounted in operative relation to the camera so as to respond only to the light of an illumination bomb dropped from the airplane carrying said camera; and an amplifier circuit and sensitivity control means interposed between and operatively connected with said photoelectric cell and with said opening means for said grid plates, rendering said photoelectric cell and amplifier incapable of causing the opening of said grid plates because of steady light on the ground, such as the light from a burning ground area that has been bombed, but permitting and causing the full opening of said grid plates to present an open exposure area of substantially four square inches, through the action of said opening means, but only in response to an intense light impulse from an illumination bomb acting upon said photoelectric cell, and which light impulse is of a predetermined great peak intensity and is rising at a predetermined rate toward its peak intensity, and which functions to cause the full opening of said grid plates only when the light intensity from the illumination bomb has reached a predetermined point in its said rise.

OSCAR STEINER.

REFERENCES CITED

The following references are of record in the file of this patent:

UNITED STATES PATENTS

| Number | Name | Date |
|---|---|---|
| 1,141,681 | Barton | June 1, 1915 |
| 1,917,245 | Edwards | July 11, 1933 |
| 1,936,595 | Goodard | Nov. 28, 1933 |
| 2,081,783 | Watson | May 25, 1937 |
| 2,350,258 | Steiner | May 30, 1944 |
| 2,367,526 | Riddell | Jan. 16 1945 |
| 2,371,072 | Simmons | Mar. 6, 1945 |
| 2,399,476 | Doyle et al. | Apr. 30, 1946 |
| 2,402,580 | Roters | June 25, 1946 |
| 2,403,609 | Perkins | July 9, 1946 |